US008843747B2

(12) United States Patent
Matsuo

(10) Patent No.: US 8,843,747 B2
(45) Date of Patent: Sep. 23, 2014

(54) COMMUNICATION APPARATUS AND COMMUNICATION SYSTEM

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 13/432,216

(22) Filed: Mar. 28, 2012

(65) Prior Publication Data

US 2012/0250866 A1 Oct. 4, 2012

(30) Foreign Application Priority Data

Mar. 31, 2011 (JP) ................................ 2011-077626

(51) Int. Cl.
*H04L 9/00* (2006.01)
*H04L 9/08* (2006.01)
*H04L 29/06* (2006.01)

(52) U.S. Cl.
CPC ............ *H04L 63/166* (2013.01); *H04L 9/0841* (2013.01); *H04L 63/1458* (2013.01); *H04L 2463/062* (2013.01); *H04L 63/061* (2013.01)
USPC ............................ 713/168; 713/171; 380/277

(58) Field of Classification Search
CPC ....... H04L 9/0841; H04L 9/08; H04L 9/0816; H04L 9/0838; H04L 63/08; H04L 63/0869; H04L 63/061; H04L 63/166; H04L 63/1458
USPC .......... 380/283–284, 277–279; 713/150–152, 713/171, 168–169, 189
See application file for complete search history.

(56) References Cited

U.S. PATENT DOCUMENTS 8,200,960 B2 * 6/2012 Belgaied et al. ............. 713/160
2010/0306525 A1 12/2010 Ferguson

OTHER PUBLICATIONS

T. Dierks, et al., "The TLS Protocol Version 1.0," Network Working Group, RFC 2246, Jan. 1999, pp. 1-67.
T. Dierks, et al., "The Transport Layer Security (TLS) Protocol Version 1.1," Network Working Group, RFC 4346, Apr. 2006, pp. 1-73.
T. Dierks, et al., "The Transport Layer Security (TLS) Protocol Version 1.2," Network Working Group, RFC 5246, Aug. 2008, pp. 1-87.
International Search Report with Written Opinion of the International Searching Authority dated Jun. 13, 2012.
K. Bicakci, et al., "Reverse SSL: Improved Server Performance and DoS Resistance for SSL Handshakes," XP 002676724, Jul. 20, 2006, pp. 1-15.
C. Castelluccia, et al., "Improving Secure Server Performance by Re-balancing SSL/TLS Handshakes," XP 002676725, Dec. 16, 2005, 9 pages total.

* cited by examiner

*Primary Examiner* — Hosuk Song
(74) *Attorney, Agent, or Firm* — Dickinson Wright PLLC

(57) ABSTRACT

A communication apparatus communicates with another communication apparatus by using a first key. The communication apparatus includes a processing unit that conducts a handshake process for a key exchange with the another communication apparatus and a key encryption unit that conducts an encryption process by using a second key. The processing unit conducts a first handshake process with the another communication apparatus without exchanging information on the first key while serving as a reception side of key information. Then, the processing unit conducts a second handshake process with the another communication apparatus to transmit the information on the first key encrypted by the key encryption unit by using the second key to the another communication apparatus.

19 Claims, 6 Drawing Sheets

COMMUNICATION APPARATUS AND COMMUNICATION SYSTEM

BACKGROUND

1. Field of the Invention

The present invention relates to an SSL (Secure Socket Layer)/TLS (Transport Layer Security) encrypted communication, and more particularly to a handshake of the SSL/TLS communication.

2. Description of the Related Art

In recent years, as a method of securely conducting communication, the SSL/TLS encrypted communication has been popularized. As examples of the SSL/TLS encrypted communication, the following references are cited: 1) T. Dierks, C. Allen, "The TLS Protocol Version 1.0", RFC 2246, [online], January of 1999 [searched on Mar. 29, 2011], Internet <http://www.ietf.org/rfc/rfc2246.txt>, 2) T. Dierks, E. Rescorla, "The Transport layer Security (TLS) Protocol Version 1.1", RFC 4346, [online], April of 2006, [Searched on Mar. 29, 2011], Internet <http://www.ietf.org/rfc/rfc4346.txt>, and 3) T. Dierks, E. Rescorla, "The Transport layer Security (TLS) Protocol Version 1.2", RFC 5246, [online], August of 2008, [Searched on Mar. 29, 2011], Internet <http://www.ietf.org/rfc/rfc5246.txt>.

However, as indicated in "Year 2010 Issues on Cryptographic Algorithms", an improvement in the decryption (cryptanalysis) capability is presently remarkable, and the key lengths of existing encryption keys. (including decryption keys) are being unsecured any more. Under the circumstances, in order to cope with this drawback, measures to further increase the key lengths have been taken in recent years. With the above treatment, it can be expected that a present risk is remarkably reduced.

However, when the key length of the encryption key (including the decryption key) is increased, the number of computer processing is remarkably increased, and a processing time is also remarkably lengthened. In particular, a load on a server that conducts Public-key Cryptosystem by using a secret key (or a private key) is measurably increased. In fact, in order to cope with "Year 2010 Issues on Cryptographic Algorithms", 1024 bits RSA (Rivest Shamir Adleman) Public-key Cryptography which is a currently mainstream Public-key Cryptosystem moves into 2048 bits RSA Public-key Cryptography, which increases the load on the server six to eight times.

For that reason, in the servers that deal with a large number of clients, an improvement treatment in the performance of CPUs leads to a remarkable increase in the costs. Moreover, in the case of a public server, a DOS (Denial Of Service) attack that forces a public key encryption or decryption processing using the private key is assumed, and therefore this influence is enormous.

SUMMARY

A communication apparatus described in the following embodiments which communicates with another communication apparatus by using a first key includes: a processing unit that conducts a handshake process for a key exchange with the another communication apparatus; and a key encryption unit that conducts an encryption process by using a second key. The processing unit conducts a first handshake process with the another communication apparatus without exchanging information on the first key while serving as a reception side of key information. Then, the processing unit conducts a second handshake process with the another communication apparatus to transmit the information on the first key encrypted by the key encryption unit by using the second key to the another communication apparatus.

DETAILED DESCRIPTION

First, a summary of an embodiment will be described.

In the embodiment, a description will be given of a handshake that exchanges a key between a server that is one communication apparatus (or another communication apparatus) and a client that is another communication apparatus (or one communication apparatus). After completion of the handshake, in order to exchange a common key for conducting an encrypted communication between the server and the client after the handshake has been completed, the server and the client share the common key in handshaking. In the embodiment, as a specific example, an SSL/TLS negotiation (SSL handshake) is used.

In the SSL/TLS negotiation, a Public-key Cryptosystem is used for sharing the common key. More specifically, the client generates the common key (first key), and encrypts the common key by using a public key transmitted to the client from the server, and transmits the encrypted common key to the server. Then, the server decrypts the common key encrypted by the public key by using a private key.

However, the above-mentioned decryption process using the private key is a heavy-duty processing, and strains the server. For example, when a plurality of clients requests the SSL/TLS negotiation at the same time, a strain on the server is large. Also, when the client is higher in processing capability than the server, it is preferable that the client conducts the decryption process by using the private key on behalf of the server. In a protocol of the SSL/TLS negotiation, however, it is determined that the server conducts the decryption process by using the private key. As a result, if the client conducts the decryption process by using the private key against the protocol, this process is blocked by a firewall, and the handshake cannot be conducted.

Under the circumstances, according to the embodiment, the server first conducts a formal first handshake while serving as "the server of the SSL/TLS negotiation" (that is, the server does not conduct the decryption process using the private key, and the common key is not exchanged in the first handshake). The server then conducts a substantial second handshake while serving as "the client of the SSL/TLS negotiation" (that is, the common key is exchanged in the second handshake). In other words, in the first handshake, the client operates as "the client of the SSL/TLS negotiation". In the second handshake, the client operates as "the server of the SSL/TLS negotiation", and conducts the decryption process using the private key.

As described above, the load on the server can be balanced by conducting the SSL/TLS negotiation.

Hereinafter, the embodiment will be described with reference to the accompanying drawings.

Figure 1:
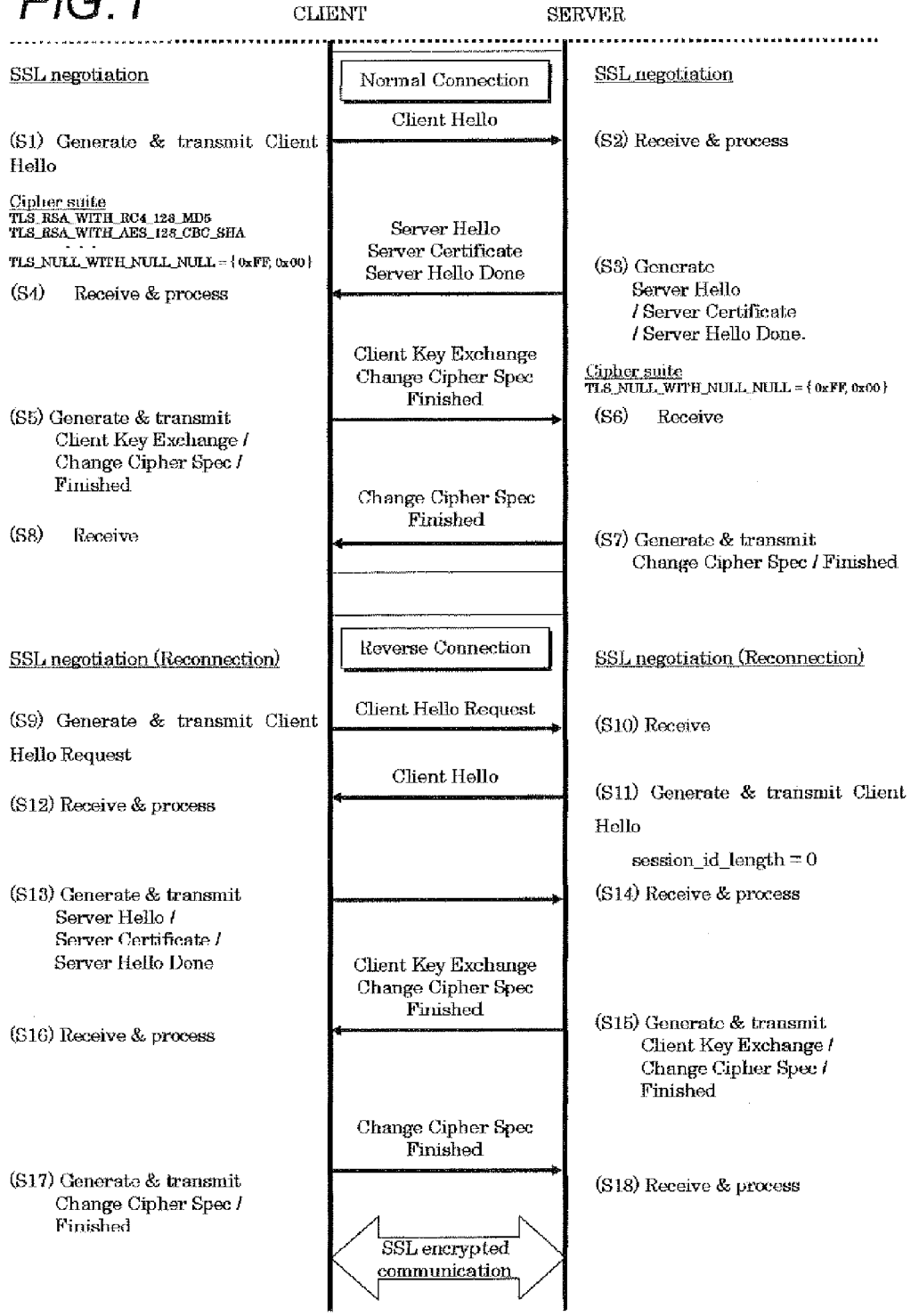
FIG. 1 is a sequence diagram illustrating a first example of an SSL/TLS encrypted communication according to an embodiment.

FIG. 1 is a sequence diagram illustrating a first example of an SSL/TLS encrypted communication according to the embodiment. For simplification of description, a Public-key Cryptosystem used in the embodiment will be described as an RSA Public-key Cryptography.

Referring to FIG. 1, a first handshake process corresponds to steps (S1) to (S8), and a second handshake process corresponds to steps (S9) to (S18). A common key encrypted by the public key is not decrypted by using the private key in the first handshake process, and the above-mentioned decryption process is conducted by the second shake.

((S1) in FIG. 1)

The client generates a Client Hello, and transmits the Client Hello to the server. The client notifies the server that the client enables reverse SSL/TLS negotiation through the Client Hello. In the present description, the "reverse SSL" means that the SSL/TLS negotiation is conducted in an opposite procedure (reverse position) to the protocol of the normal SSL/TLS negotiation. Also, the "reverse SSL" means that the above-mentioned second handshake is conducted, and also means that the server does not conduct the decryption process using the private key in the first handshake. That is, the server operates as "client" of the normal SSL/TLS negotiation, and the client operates as "server" of the normal SSL/TLS negotiation.

There are various methods for the client to notify the server that the reverse SSL/TLS negotiation can be used, which are not limited to one method.

For example, a specific command is set in extra data of the Client Hello to enable the above notification, and a specific value is set in Random Bytes of the Client Hello to notify the server that the reverse SSL/TLS negotiation is enabled.

Likewise, there are various methods for the server to request the client to use the reverse SSL/TLS negotiation, which are not limited to one method.

For example, a specific command is set in the extra data of the Server Hello to enable such a requirement, or a specific value is set in Random bytes of the Server Hello to enable such a requirement.

Even if the client does not inform the server that the reverse SSL/TLS negotiation is enabled, the server may forcedly request the client to use the reverse SSL/TLS negotiation.

If the reverse SSL/TLS negotiation is always conducted, there is no need for the client to notify the server that the reverse SSL/TLS negotiation can be used, and there is also no need for the server to request the client to use the reverse SSL/TLS negotiation.

However, as described above, if the client notifies the server that the reverse SSL/TLS negotiation can be used, and the server requires the client to use the reverse SSL/TLS negotiation, the server can use both of the normal SSL/TLS negotiation and the reverse SSL/TLS negotiation, and easily switch between the normal SSL/TLS negotiation and the reverse SSL/TLS negotiation, which is preferable, but optional.

In the embodiment, it is assumed that a first byte is 0xFF, that is, a private cipher suite is set to the Client Hello so that the client notifies the server that the reverse SSL/TLS negotiation is enabled. Thus, the method of notifying the server that the reverse SSL/TLS negotiation is enabled by the presentation of the cipher suite is better than the above-mentioned method because of sure transmission.

The private cipher suite may be set in any manner. In the embodiment, it is assumed that the client notifies the server that the reverse SSL/TLS negotiation is enabled, by the following cipher suite.

TLS_NULL_WITH_NULL_NULL={0xFF, 0x00}

This is a cipher suite different from {0x00, 0x00}. The private cipher suite can be replaced with the cipher suite of {0x00, 0x00} so that the client notifies the server that the reverse SSL/TLS negotiation is enabled. However, the cipher suite does not meet the specification of the SSL/TLS encrypted communication.

In this example, only the private cipher suite may be set in the Client Hello. However, there is case where the server could not execute the reverse SSL/TLS negotiation, or whether the server executes the reverse SSL/TLS negotiation, or not, may be automatically determined. For that reason, it is preferable, but optional, that not only the private cipher suite but also other cipher suites available by the client are designated in the Client Hello. This makes it possible to execute the normal SSL/TLS negotiation by determination of the server.

In the embodiment, as illustrated in FIG. 1, as a plurality of designated cipher suites, for example, there are following cipher suites.

TLS_RSA_WITH_RC4_128_MD5
TLS_RSA_WITH_AES_128_CBC_SHA
. . .
TLS_NULL_WITH_NULL_NULL=[0xFF, 0x00]

((S2) in FIG. 1)

The server receives and processes this Client Hello. The server confirms that the private cipher suite is designated, and knows that the client enables the reverse SSL/TLS negotiation.

((S3) in FIG. 1)

The server generates a Server Hello, Server Certificate and Server Hello Done, and transmits the Server Hello, Server Certificate and Server Hello Done to the client. In this example, as the cipher suite of the Server Hello, the server designates the above-mentioned private cipher suite. As a result, the server requires the client to execute the reverse SSL/TLS negotiation.

If the existing CPU utilization is not large, the server may select and execute the normal SSL/TLS negotiation. In this case, the server selects the cipher suite other than the private cipher suite. The CPU corresponds to a computing unit that conducts arithmetic processing.

In this example, it is assumed that the CPU utilization of the server is large, and as illustrated in FIG. 1, the server designates the private cipher suite.

((S4) in FIG. 1)

The client receives and processes this Server Hello, Server Certificate, and Server Hello Done. The client confirms that the private cipher suite is designated, and understands that the reverse SSL/TLS negotiation is executed.

Unless the private cipher suite is designated, the client then executes the normal SSL/TLS negotiation.

((S5) in FIG. 1)

The client generates a Client Key Exchange, Change Cipher Spec, and Finished. Data parts (including MAC) of the Client Key Exchange and the Finished can be correctly calculated and set by using the public key described in a server certificate. However, if the processing of the Public-key Cryptosystem is omitted, the performance is improved, and therefore dummy data is preferably set in the data part. The dummy data may be any one of a random number and a determined fixed value.

Subsequently, the client transmits the Client Key Exchange, Change Cipher Spec and Finished to the server.

((S6) in FIG. 1)

The server receives the Client Key Exchange, Change Cipher Spec, and Finished. The server does not process the data part of the Client Key Exchange, Change Cipher Spec, and Finished. That is, the processing of the Public-key Cryptosystem using the secret key is not conducted. Also, the Change Cipher Spec may not be processed.

((S7) in FIG. 1)

The server generates a Change Cipher Spec and Finished. The data part (including MAC) of the Finished is set with the dummy data. The dummy data may be any one of a random number and a predetermined fixed value. Then, the server transmits the Change Cipher Spec and Finished to the client.

((S8) in FIG. 1)

The client receives the Change Cipher Spec and Finished. The client does not process the data part of the Finished. Also, the client may not process the Change Cipher Spec.

In a series of that SSL/TLS negotiation, since the server does not conduct the Public-key Cryptosystem using the secret key, a CPU load is very small. However, since that SSL/TLS negotiation is a dummy SSL/TLS negotiation, the exchange of a correct common key cannot be conducted.

A major object for conducting the dummy SSL/TLS negotiation is to determine a load balance of the system, for example, to determine whether to use the reverse SSL/TLS negotiation between the client and the server.

Another object of the dummy SSL/TLS negotiation is to pretend to be the normal SSL/TLS negotiation with respect to a communication control device such as the firewall, and prevent the subsequent communication from being blocked. Data transmitted or received on the network seems to comply with the specification of the SSL/TLS encrypted communication as viewed from a third party, and therefore the communication can be prevented from being blocked.

((S9) in FIG. 1)

The client generates a Client Hello Request, and transmits the Client Hello Request to the server. From this moment, the client functions as "server in the SSL/TLS negotiation". In order to prevent description from being complicated, the client is still called "client" in the following description.

((S10) in FIG. 1)

The server receives the Client Hello Request. From this moment, the server functions as "client in the SSL/TLS negotiation". In order to prevent description from being complicated, the server is still called "server" in the following description.

((S11) in FIG. 1)

Upon receiving the Client Hello Request, the server generates a Client Hello, and transmits the Client Hello to the client.

In Steps S8 to S11, a TCP port is not closed. That is, the same socket as that of the dummy SSL/TLS negotiation is continuously used.

Also, in the dummy SSL/TLS negotiation, since the session is not correctly established, a correct master secret is not generated. For that reason, the session ID designated by the server in the dummy SSL/TLS negotiation is not valid. Accordingly, the subsequent SSL/TLS negotiation is not a negotiation for restarting the existing session, but a negotiation for establishing a new session.

The server can set the session ID designated by the server in the dummy SSL/TLS negotiation in the session ID of the Client Hello without any problem. However, the client is required to prevent the negotiation for restarting the existing session from occurring. Likewise, when the client designates the session ID by the Server Hello, the server is required to also prevent the negotiation for restarting the existing session from occurring.

In this example, it is desirable that the session_id_length of the Hello is set to 0 in conformity to the specification of the SSL/TLS encrypted communication. Also, it is desirable that the session ID designated by the Server Hello which is a response to the Client Hello is set to a value different from that of the session ID designated by the server in the dummy SSL/TLS negotiation.

Alternatively, with omission of the transmission and reception of the Client Hello Request, the server may generate the Client Hello immediately after the dummy SSL/TLS negotiation, and transmit the Client Hello to the client.

If the client or the server transmit the data until Step S18 is terminated from the dummy SSL/TLS negotiation, it is desirable that the receiver side discards this data, and blocks the communication from the viewpoint of protecting against an MITM (Man-In-The-Middle) attack.

((S12) in FIG. 1)

The client receives and processes this Client Hello.

((S13) in FIG. 1)

The client generates a Server Hello, Server Certificate, and Server Hello Done, and transmits the Server Hello, Server Certificate, and Server Hello Done to the server.

((S14) in FIG. 1)

The server receives and processes the Server Hello, Server Certificate, and Server Hello Done.

((S15) in FIG. 1)

The server generates a Client Key Exchange, Change Cipher Spec, and Finished, and transmits the Client Key Exchange, Change Cipher Spec, and Finished to the client.

The server can generate a correct common key (including a MAC key) at this moment in conformity to the specification of the SSL/TLS encrypted communication. Accordingly, the data part (including the MAC) of the Finished is correctly encrypted with the common key.

In this example, in generating a Client Key Exchange, the server conducts the processing of the Public-key Cryptosystem by using the public key. The arithmetic processing is reduced by a single digit or more as compared with the processing of the Public-key Cryptosystem using the private key, and a load on a CPU is very small.

((S16) in FIG. 1)

The client receives the Client Key Exchange, Change Cipher Spec, and Finished. In this example, in order to process the Client Key Exchange, the client decrypts the Public-key Cryptosystem by using the private key.

As a result of that decryption, the client can generate a correct common key (including the MAC key) at this moment in conformity to the specification of the SSL/TLS encrypted communication. Accordingly, the data part (including the MAC) of the Finished is correctly decrypted with the common key.

((S17) in FIG. 1)

The client generates a Change Cipher Spec, and Finished, and transmits the Change Cipher Spec, and Finished to the server. The data part (including the MAC) of the Finished is correctly encrypted with the common key.

((S18) in FIG. 1)

The server receives and processes the Change Cipher Spec, and Finished. The data part (including the MAC) of the Finished is correctly decrypted with the common key, and processed.

In the subsequent processing, the common key of the SSL/TLS encrypted communication is correctly encrypted between the client and the server.

In conformity to the specification of the SSL/TLS encrypted communication, the data parts of the respective messages that are exchanged in Steps (S9) to (S18) must be encrypted. On the other hand, the data parts of the respective messages that are exchanged in Steps (S9) to (S18) may not be actually encrypted except for the Finished.

Figure 6:
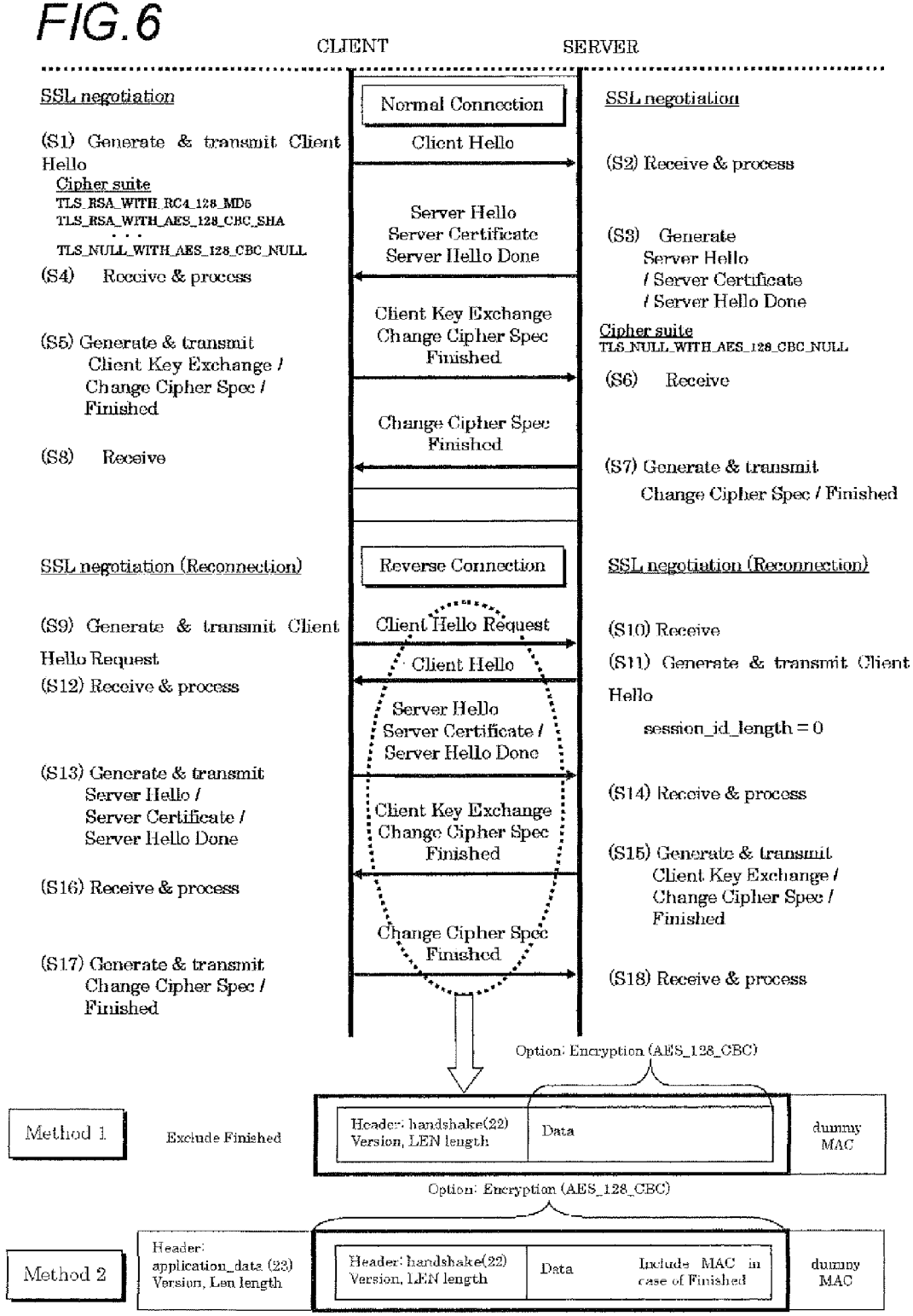
FIG. 6 is a sequence diagram illustrating a second example of an SSL/TLS encrypted communication according to the embodiment.

Subsequently, a description will be given of an example different from that of FIG. 1 with reference to FIG. 6. FIG. 6 is a sequence diagram illustrating a second example of the SSL/TLS encrypted communication according to the embodiment. Referring to FIG. 6, a first handshake process corresponds to steps (S1) to (S8), and a second handshake process corresponds to steps (S9) to (S18).

As illustrated in FIG. 6, for the purpose of obfuscation, a dummy MAC may be allocated to the data parts of the respective messages except for the Finished so as to pretend that a reconnection negotiation encrypted by the common key encryption is conducted. Further, the data parts (including the dummy MAC) may be encrypted (scrambled) with the random number and the fixed value transmitted and received in the SSL/TLS negotiation as the common keys.

The obfuscation of this type is of a technique effective when the firewall rigorously checks the data parts of the respective messages. If the common key is daringly generated, it is preferable that the client generates a pre_master_ secret by random numbers, and deals with the pre_master_ secret as an EncryptedPreMasterSecret with remaining unencrypted, and the server also treats with the EncryptedPreMasterSecret as the pre_master_secret as it is, so that the client and the server generate the common key.

In this example, it is assumed that the private cipher suite is represented as follow.
TLS_NULL_WITH_NULL_NULL={0xFF, 0x00}
If the private cipher suite is changed to, for example, TLS_NULL_WITH_AES_128_CBC_NULL={0xFF, 0x00} as illustrated in FIG. 6, and encryption and decryption are conducted, the data part is most suited for the specification of the SSL/TLS encrypted communication, and an alteration to an SSL/TLS cryptographic module that realizes the SSL/TLS encrypted communication is reduced.

When the firewall strictly counts the number of packets of the handshake transmitted or received in the renegotiation of the SSL/TLS, the packets of the dummy handshake may be transmitted or received to pretend that the SSL/TLS negotiation is executed several times.

Also, there is a preferable method in which all of the messages (including a Change Cipher Spec) in Steps (S9) to (S18) pretend to be an encrypted data communication as illustrated in FIG. 6. That is, the respective messages that are exchanged in Steps (S9) to (S18) are transmitted and received as the data communication, that is, the data part of application_data. With the above process, even if the firewall strictly counts the number of packets of the handshake transmitted or received in the renegotiation of the SSL/TLS, this process passes the check.

However, the SSL/TLS encrypted communication is normally realized by the SSL/TLS encrypted communication module which is separated from an application program. Therefore, it is undesirable that the SSL/TLS encrypted communication module conducts the SSL/TLS negotiation by the aid of the data communication used by the application program. In this arrangement, the SSL/TLS encrypted communication module is required to always check the contents of the data communication used by the application program, and the performance is degraded.

However, since the SSL/TLS negotiation in Steps (S9) to (S18) is conducted immediately after the dummy SSL/TLS negotiation, even if the SSL/TLS negotiation is conducted by using the data communication, the performance can be prevented from being degraded. The SSL/TLS encrypted communication module checks the contents of the data communication since the dummy SSL/TLS negotiation starts until the SSL/TLS negotiation in Steps (S9) to (S18) is completed, and after completion of the SSL/TLS negotiation, the SSL/TLS encrypted communication module may not check the contents of the data communication.

If the SSL/TLS negotiation is conducted in the data communication, the common key may be exchanged in a unique method, but the common key is not exchanged in the dummy SSL/TLS negotiation. For that reason, even in the data communication, the SSL/TLS negotiation in Steps (S9) to (S18) is basically unencrypted, or conducted by plaintext. That is, even if the SSL/TLS negotiation is scrambled, the contents can be analyzed by a third party. Accordingly, it is preferable that the exchange of the common key, which is conducted in this example, complies with the encrypted communication specification tolerant to various attacks or having knowledge of the attacks. Taking a fact that the client and the server accept the SSL encrypted communication into account, it is desirable that the SSL/TLS negotiation is used for exchange of the common key, which is conducted in this example, as illustrated in FIG. 1.

When the reconnection is conducted after the reverse SSL/TLS negotiation has been completed, the function of the client is returned to "client in the SSL/TLS negotiation", and the function of the server is returned to "server in the SSL/TLS negotiation", so as to comply with the specification of the normal SSL/TLS encrypted communication. This is preferable because of no complication.

If the connection is conducted by a new ID, and the client intends to encrypt the public key by using the private key, the processing may be returned to Step (S1).

Thus, if the dummy SSL/TLS negotiation is conducted as illustrated in FIG. 1, even if a device for controlling the communication such as the firewall is interposed between the client and the server, the communication can be prevented from being blocked.

Also, if the reverse SSL/TLS negotiation is conducted as illustrated in FIG. 1, the server does not have to conduct the Public-key Cryptosystem process using the private key, and therefore the CPU load can be reduced. This leads to such an advantage that the server costs can be reduced. As the number of clients dealt with by the server is more increased, this advantage becomes greater. Thus, the embodiment is different from a NAT traversal technique.

Moreover, the server can determine and execute whether to conduct the normal SSL/TLS negotiation or the reverse SSL/TLS negotiation, and therefore the server can conduct an exact load balance. When the load on the server is low, the normal SSL/TLS negotiation is conducted (in this case, the dummy SSL/TLS negotiation corresponds to the real SSL/TLS negotiation), and when the load on the server is high, the reverse SSL/TLS negotiation is conducted, to thereby enable the load on the overall system to be optimized. That is, the cost-benefit performance can be maximized.

Accordingly, the dummy SSL/TLS negotiation is very important in conducting not only the NAT traversal but also the load balance of the system.

In particular, this advantage is very high in operating the server public on the Internet. In general, the public server is frequently subject to DOS attacks. In the case of the public server that supports the SSL/TLS encrypted communication, when the public encryption process using a useless private key is frequently executed, the costs paid for that execution become enormous.

However, if only the client that supports the reverse SSL/TLS negotiation is to be connected to the public server, the constant CPU utilization is kept without increasing the costs, thereby posing no problem for service.

In addition, the series of SSL/TLS negotiations hardly deviate from the specification of the SSL/TLS encrypted communication, and can utilize the knowledge of various attacks against the SSL/TLS encrypted communication to achieve safety.

Also, since the series of SSL/TLS negotiations hardly deviate from the specification of the SSL/TLS encrypted communication, a configuration of the SSL/TLS cryptographic module that realizes the SSL/TLS encrypted communication can be simplified, and the development costs can be reduced.

Figure 2:
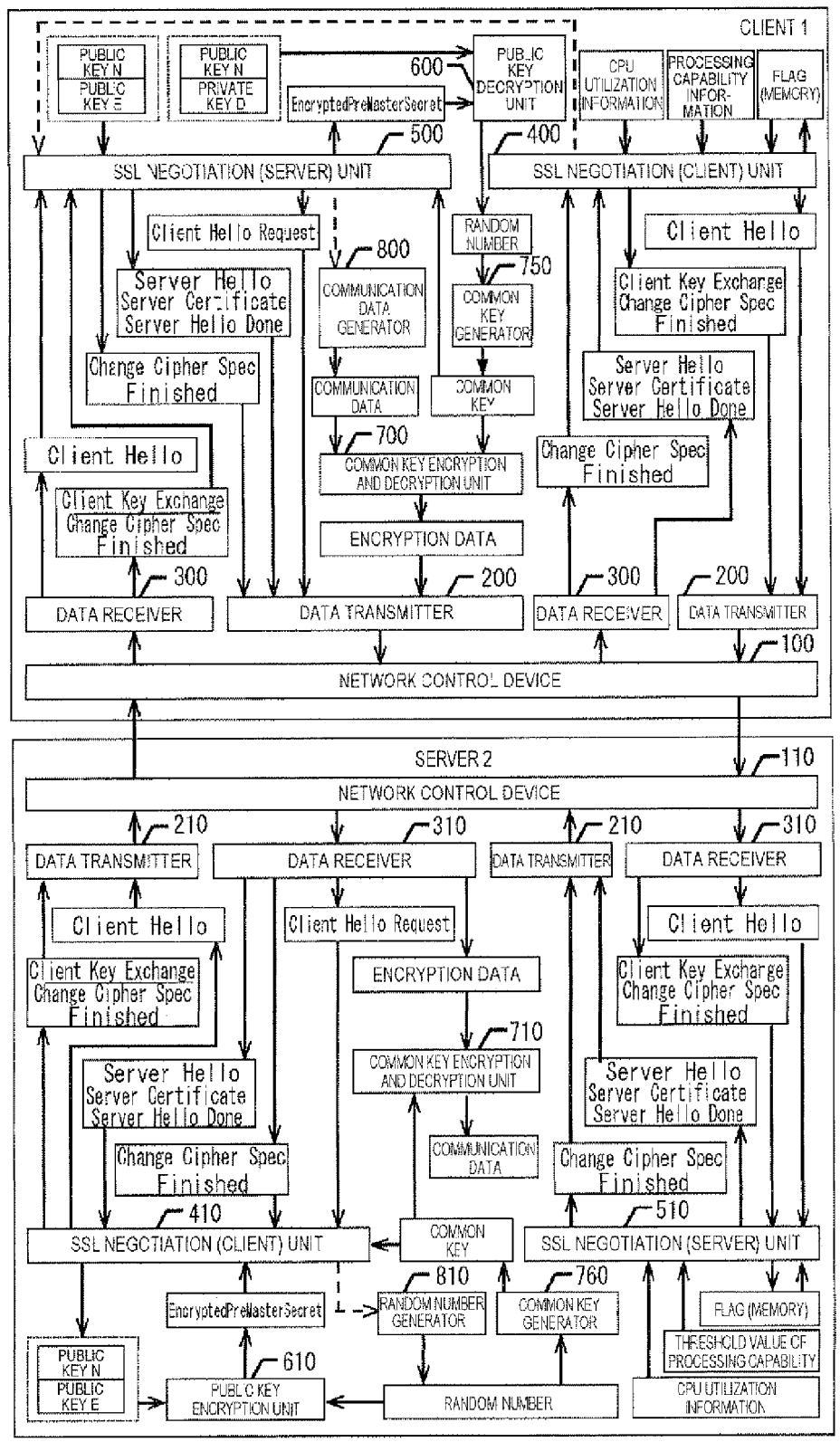
FIG. 2 is a diagram illustrating an example of a functional block according to the embodiment.
Figure 3:
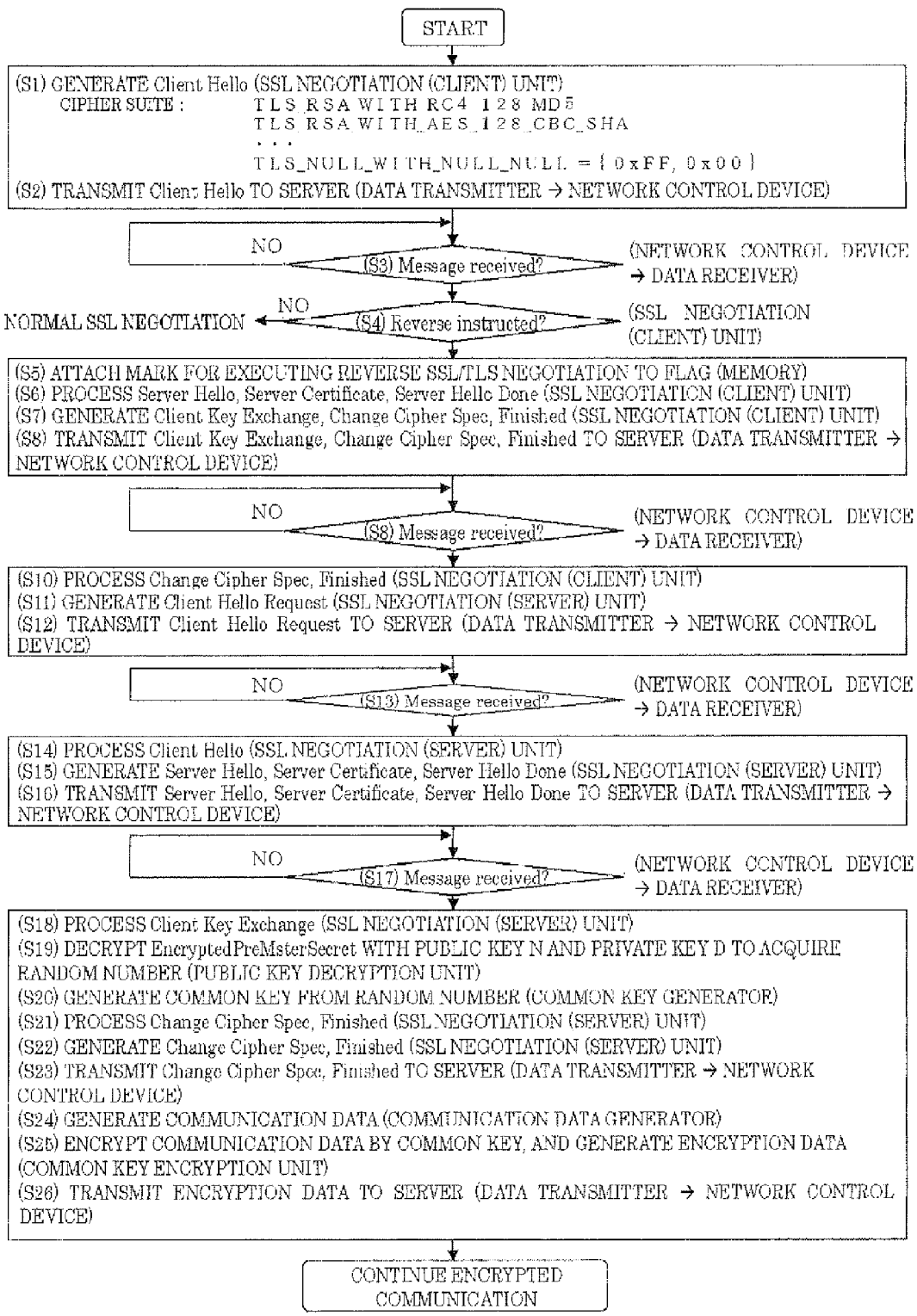
FIG. 3 is a flowchart illustrating an example of a client side according to the embodiment.
Figure 4:
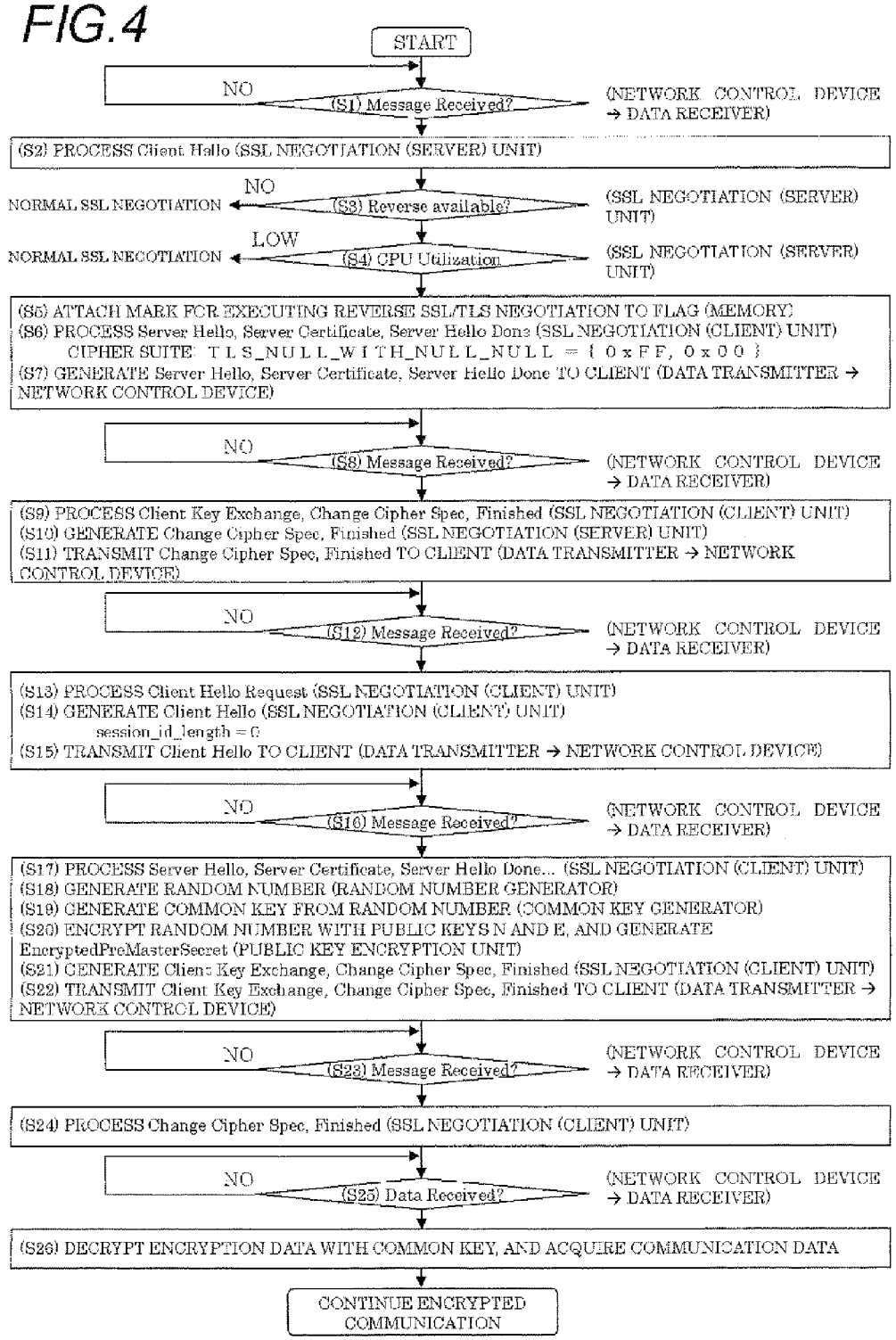
FIG. 4 is a flowchart illustrating an example of a server side according to the embodiment.

FIG. 2 illustrates an example of a functional block of FIG. 1. FIG. 3 illustrates a flowchart of a client 1 in FIG. 2, and FIG. 4 illustrates a flowchart of a server 2. Subsequently, a description will be given with reference to FIGS. 2, 3, and 4.

Referring to FIG. 3, the first handshake process corresponds to Steps (S1) to (S10), and the second handshake process corresponds to Steps (S11) to (S26). Referring to FIG. 4, the first handshake process corresponds to Steps (S1) to (S11), and the second handshake process corresponds to Steps (S13) to (S26).

The client 1 conducts the SSL/TLS encrypted communication with the server 2 on a network.

((S1) in FIG. 3)

First, an SSL negotiation (client) unit 400 generates a Client Hell message, and transmits the message to a data transmitter 200.

In the following description, it is assumed that cipher suites designated by the Client Hello message are represented as follows.
TLS_RSA_WITH_RC4_128_MD5
TLS_RSA_WITH_ARS_128_CBC_SHA
. . .
TLS_NULL_WITH_NULL_NULL=[0xFF, 0x00]

In this example, TLS_NULL_WITH_NULL_NULL is a private cipher suite which is a cipher suite different from [0x00, 0x00]. The private cipher suite is designed so that the client notifies the server that the client can execute the reverse SSL/TLS negotiation.

It is assumed that a processing capability detection (client) unit (not shown) of the client 1 detects processing capability information on its own CPU (maximum processing capability information on CPU), and notifies the SSL negotiation (client) unit 400 of the detected processing capability information, and the SSL negotiation (client) unit 400 allows the processing capability information to be included in the Client Hello message, and notifies the server of the processing capability information. Examples of this method are variously proposed. For example, level values of the processing capability may be set in a part of Random bytes or a session ID. In this example, it is assumed that the processing capability information (level values of processing capability) is set in a part of the Random bytes. The information on the maximum processing capability may be stored in a flag (memory) in advance.

The client 1 further includes a processing (usage) status detection (client) unit (not shown), and the processing (usage) status detection (client) unit detects CPU utilization information, and notifies the SSL negotiation (client) unit 400 of this information. The SSL negotiation (client) unit 400 notifies the server 2 whether a decryption process of the Public-key Cryptosystem by using the private key can be conducted, or not, on the basis of the CPU utilization information. For example, if the CPU utilization is a given value or higher, the SSL negotiation (client) unit 400 notifies the server 2 of a cipher suite list including the private cipher suite. If the CPU utilization is the given value or lower, the SSL negotiation (client) unit 400 notifies the server 2 of the cipher suite list including no private cipher suite. With this configuration, the decryption process of the Public-key Cryptosystem by using the private key enables another process of the client 1 to be prevented from being broken down.

As a result, in ((S1) in FIG. 3), the SSL negotiation (client) unit 400 creates the Client Hello including information on the cipher suite list having the private cipher suite and information on the processing capability information of the CPU. The information on the CPU utilization of the client may be included in the Client Hello.

((S2) in FIG. 3)

The data transmitter 200 transmits the Client Hello message to the server 2 through a network control device 100.

((S3) in FIG. 3)

Thereafter, the client 1 becomes in a message standby state for waiting for a message from the server 2.

((S1) in FIG. 4)

The server 2 starts in a message standby state for waiting for a message from the client 1. A data receiver 310 receives the Client Hello message transmitted by the client 1 through a network control device 110. The data receiver 310 transmits the Client Hello message to an SSL negotiation (server) unit 510 that interprets the Client Hello message.

((S2) in FIG. 4)

The SSL negotiation (server) unit 510 processes the Client Hello message.

((S3) in FIG. 4)

In this situation, the SSL negotiation (server) unit 510 checks whether a cipher suite of the TLS_NULL_WITH_NULL_NULL which is a sign of the reverse SSL/TLS negotiation is designated in the Client Hello message, or not.

Unless the TLS_NULL_WITH_NULL_NULL is designated, the reverse SSL/TLS negotiation cannot be executed, and therefore the normal SSL/TLS negotiation is conducted. That is, the cipher suite other than the private cipher suite is selected.

When the server deals with nothing other than the clients that enable the reverse SSL/TLS negotiation, an access that disables the reverse SSL/TLS negotiation is of the DOS attack, and therefore it is desirable to interrupt the processing at this time. As a result, the security can be enhanced.

In this example, as described in (S1) of FIG. 3, since the TLS_NULL_WITH_NULL_NULL is designated, the SSL negotiation (server) unit 510 determines that the client can conduct the reverse SSL/TLS negotiation.

((S4) in FIG. 4)

The server 2 further includes the processing (usage) status detection (server) unit (not shown), and the processing (usage) status detection (server) unit detects the CPU utilization information, and notifies the SSL negotiation (server) unit 510 of this information. The SSL negotiation (server) unit 510 checks the CPU utilization information of the server 2. If the CPU utilization of the server 2 is small (for example, if the CPU utilization is lower than a given value (threshold value)), even if the server 2 executes the Public-key Cryptosystem process by using the private key, the server 2 suffers from no difficulty. Therefore, the server 2 conducts the normal SSL/TLS negotiation. Alternatively, the reverse SSL/TLS negotiation can be always conducted without the above determination.

In ((S4) in FIG. 4), if the SSL negotiation (server) unit 510 of the client 1 included in the received Client Hello checks the processing capability information (level values of processing capability) of the client 1 described in a part of the Random bytes of the Client Hello message, and conducts the reverse SSL/TLS negotiation only when the processing capability information is a given level value (threshold value of processing capability in FIG. 2) or more, the SSL negotiation (server) unit 510 can optimize the performance of the overall system. What level the reverse SSL/TLS negotiation is executed at depends on the processing capability of the server.

In the embodiment, assuming that the CPU utilization of the server and the processing capability of the client are high, and the SSL negotiation (server) unit 510 executes the reverse SSL/TLS negotiation, a description will be given below.

((S5) in FIG. 4)

The SSL negotiation (server) unit 510 attaches a mark for executing the reverse SSL/TLS negotiation to the flag (memory).

((S6) in FIG. 4)

The SSL negotiation (server) unit 510 generates Server Hello, Server Certificate, and Server Hello Done messages, and transmits the messages to a data transmitter 210. In this situation, since the mark for executing the reverse SSL/TLS negotiation is attached to the flag (memory), the TLS_NULL_WITH_NULL_NULL which is the sign of the reverse SSL/TLS negotiation is designated as the cipher suite.

Except for the cipher suite, correct values may not be set for the data parts of the Server Hello and Server Certificate messages. Dummy data such as random numbers or fixed values may be applicable. As a result, the server 2 can omit unnecessary processing.

The SSL negotiation (server) unit 510 can unconditionally designate the TLS_NULL_WITH_NULL_NULL for the purpose of executing the reverse SSL/TLS negotiation regardless of the past steps.

((S7) in FIG. 4)

The data transmitter 210 transmits the Server Hello/Server Certificate/Server Hello Done messages to the client 1 through the network control device 110. For simplification of the processing in the server 2, the data transmitter 210 may not transmit the public key to the client 1.

((S8) in FIG. 4)

Thereafter, the server 2 waits for a message from the client 1.

((S3) in FIG. 3)

A data receiver 300 of the client 1 receives the Server Hello, Server Certificate, and Server Hello Done messages transmitted from the server 2 through the network control device 100. The data receiver 300 transmits the Server Hello, Server Certificate, and Server Hello Done messages to the SSL negotiation (client) unit 400 for processing the Server Hello, Server Certificate, and Server Hello Done messages.

((S4) in FIG. 3)

The SSL negotiation (client) unit 400 checks whether the TLS_NULL_WITH_NULL_NULL which is the sign of the reverse SSL/TLS negotiation is designated, or not. Unless the TLS_NULL_WITH_NULL_NULL is designated, the SSL negotiation (client) unit 400 executes the normal SSL/TLS negotiation.

((S5) in FIG. 3)

If the TLS_NULL_WITH_NULL_NULL is designated, the SSL negotiation (client) unit 400 determines that the reverse SSL/TLS negotiation is executed, and the SSL negotiation (client) unit 400 attaches the mark for executing the reverse SSL/TLS negotiation to the flag (memory).

((S6) in FIG. 3)

The SSL negotiation (client) unit 400 processes the Server Hello, Server Certificate, and Server Hello Done messages.

The SSL negotiation (client) unit 400 watches the flag (memory), and if there is the mark for executing the reverse SSL/TLS negotiation, the message may be really discarded without any processing. As a result, the client 1 can omit unnecessary processing.

((S7) in FIG. 3)

The SSL negotiation (client) unit 400 generates Client Key Exchange, Change Cipher Spec, and Finished messages, and transmits the messages to the data transmitter 200.

The SSL negotiation (client) unit 400 watches the flag (memory), and if there is the mark for executing the reverse SSL/TLS negotiation, the SSL negotiation (client) unit 400 may not set correct values in data parts (including MAC) of the Client Key Exchange message and the Finished message. Dummy data such as random numbers or fixed values may be applicable.

((S8) in FIG. 3)

The data transmitter 200 transmits the Client Key Exchange, Change Cipher Spec, and Finished messages to the server 2 through the network control device 100.

((S9) in FIG. 3)

Thereafter, the client 1 waits for the messages from the server 2.

((S8) in FIG. 4)

The data receiver 310 receives the Client Key Exchange, Change Cipher Spec, Finished messages transmitted from the client 1 through the network control device 110. The data receiver 310 transmits the Client Key Exchange, Change Cipher Spec, and Finished messages to the SSL negotiation (server) unit 510 for processing the Client Key Exchange, Change Cipher Spec, and Finished messages.

((S9) in FIG. 4)

The SSL negotiation (server) unit 510 processes the Client Key Exchange, Change Cipher Spec, and Finished messages. However, since the mark for executing the reverse SSL/TLS negotiation is attached to the flag (memory), at least the EncryptedPreMasterSecret of the Client Key Exchange is not processed. That is, the Public-key Cryptosystem process by using the private key is not implemented. Also, the data of the Finished message is not checked. The other data may be also discarded without any processing. As a result, the client 1 can omit unnecessary processing.

((S10) in FIG. 4)

The SSL negotiation (server) unit 510 generates Change Cipher Spec, and Finished messages, and transmits the messages to the data transmitter 210. However, since the mark for executing the reverse SSL/TLS negotiation is attached to the flag (memory), dummy data such as random numbers or fixed values is set for the data part (including MAC) of the Finished message.

Since the mark for executing the reverse SSL/TLS negotiation is attached to the flag (memory), the SSL negotiation (server) unit 510 calls for not a common key encryption and decryption unit 710 that decrypts the Public-key Cryptosystem by using the private key, but an SSL negotiation (client) unit 410. Then, the SSL negotiation (server) unit 510 authorizes the SSL negotiation (client) unit 410 to transmit and receive the subsequent messages.

((S11) in FIG. 4)

The data transmitter 210 transmits the Change Cipher Spec and Finished messages to the client 1 through the network control device 110.

((S12) in FIG. 4)

Thereafter, the server 2 waits for the messages from the client 1. The SSL negotiation (client) unit 410 waits for the message.

((S9) in FIG. 3)

The data receiver 300 of the client 1 receives the Change Cipher Spec and Finished messages transmitted from the server 2 through the network control device 100. The data receiver 300 transmits the Change Cipher Spec and Finished messages to the SSL negotiation (client) unit 400 for processing the Change Cipher Spec and Finished messages.

((S10) in FIG. 3)

The SSL negotiation (client) unit 400 processes the Change Cipher Spec/Finished messages.

Since the mark for executing the reverse SSL/TLS negotiation is attached to the flag (memory), at least data of the Finished message is not checked. The other data may be also discarded without any processing. As a result, the client 1 can omit unnecessary processing.

As described above, the past SSL/TLS negotiation corresponds to the dummy SSL/TLS negotiation. That is, the processing is formally conducted according to a protocol of the SSL negotiation so as not to be blocked by the firewall, but a process conducted in the normal SSL negotiation such as key exchange is not executed.

After completion of the dummy SSL/TLS negotiation, the server 2 does not receive data for the purpose of protecting against the MITM attack until the subsequent SSL/TLS negotiation is terminated. If the server 2 receives data, the server 2 discards the data, and blocks the communication. As a result, the security can be enhanced.

Subsequently, since the mark for executing the reverse SSL/TLS negotiation is attached to the flag (memory), the SSL negotiation (client) unit 400 calls for not a common key encryption and decryption unit 700 or a communication data generator 800, but an SSL negotiation (server) unit 500. Then, the SSL negotiation (client) unit 400 authorizes the SSL negotiation (server) unit 500 to transmit and receive the subsequent messages.

In FIG. 2, whether the reverse SSL/TLS negotiation is executed or not, is indicated by using the flag (memory). However, the realizing method is not limited to this configuration, but various methods are applicable.

((S11) in FIG. 3)

The SSL negotiation (server) unit 500 generates a Client Hello request message, and transmits this message to the data transmitter 200.

((S12) in FIG. 3)

The data transmitter 200 transmits the Client Hello request message to the server 2 through the network control device 100.

((S13) in FIG. 3)

Thereafter the client 1 waits for the message from the server 2. In this example, the SSL negotiation (server) unit 500 waits for the message.

((S12) in FIG. 4)

The data receiver 310 receives the Client Hello request message transmitted from the client 1 through the network control device 110. The data receiver 310 transmits the Client Hello request message to the SSL negotiation (client) unit 410 for processing the Client Hello request message.

((S13) in FIG. 4)

The SSL negotiation (client) unit 410 processes the Client Hello request message. More specifically, the SSL negotiation (client) unit 410 starts the generation of the Client Hello message.

((S14) in FIG. 4)

The SSL negotiation (client) unit 410 generates the Client Hello message, and transmits this message to the data transmitter 210.

It is assumed that the cipher suite of the TLS_NULL_WITH_NULL_NULL is not designated in the Client Hello request message.

((S15) in FIG. 4)

The data transmitter 210 transmits the Client Hello message to the client 1 through the network control device 110.

((S16) in FIG. 4)

Thereafter, the server 2 waits for the message from the client 1.

((S13) in FIG. 3)

The data receiver 300 receives the Client Hello message transmitted from the server 2 through the network control device 100. The data receiver 300 transmits the Client Hello message to the SSL negotiation (server) unit 500 for processing the Client Hello message.

((S14) in FIG. 3)

The SSL negotiation (server) unit 500 processes the Client Hello message.

((S15) in FIG. 3)

The SSL negotiation (server) unit 500 generates the Server Hello, Server Certificate, and Server Hello Done messages, and transmits the messages to the data transmitter 200. It is assumed that, as the cipher suite, the TLS_NULL_WITH_NULL_NULL which is the sign of the reverse SSL/TLS negotiation is not designated.

The Server Certificate includes information on a public key N and a public key E which are held by the client 1.

((S16) in FIG. 3)

The data transmitter 200 transmits the Server Hello, Server Certificate, and Server Hello Done messages to the server 2 through the network control device 100.

((S17) in FIG. 3)

Thereafter, the client 1 waits for the messages from the server 2.

((S16) in FIG. 4)

The data receiver 310 of the server 2 receives the Server Hello, Server Certificate, and Server Hello Done message transmitted from the client 1 through the network control device 110. The data receiver 310 transmits the Server Hello, Server Certificate, and Server Hello Done messages to the SSL negotiation (client) unit 410 for processing the Server Hello, Server Certificate, and Server Hello Done messages.

((S17) in FIG. 4)

The SSL negotiation (client) unit 410 processes the Server Hello, Server Certificate, and Server Hello Done messages.

The SSL negotiation (client) unit 410 reads information on the public key N and the public key E held by the client 1 from the Server Certificate.

((S18) in FIG. 4)

The SSL negotiation (client) unit 410 allows a random number generator 810 to generate a random number that becomes a premaster secret.

((S19) in FIG. 4)

A common key generator 760 generates a common key (including MAC key) used in a common key cryptography from the random number.

((S20) in FIG. 4)

A public key encryption unit 610 encrypts the random number by using the public key N and the public key E, and generates an EncryptedPreMasterSecret.

((S21) in FIG. 4)

The SSL negotiation (client) unit 410 generates the Client Key Exchange, Change Cipher Spec, and Finished messages, and transmits the messages to the data transmitter 210. The data part (including MAC) of the Finished message is encrypted with the common key.

((S22) in FIG. 4)

The data transmitter 210 transmits the Client Key Exchange, Change Cipher Spec, and Finished messages to the client 1 through the network control device 110.

((S23) in FIG. 4)

Thereafter, the server 2 waits for the messages from the client 1.

((S17) in FIG. 3)

The data receiver 300 receives the Client Key Exchange, Change Cipher Spec, and Finished messages transmitted from the server 2 through the network control device 100. The data receiver 300 transmits the Client Key Exchange, Change Cipher Spec, and Finished messages to the SSL negotiation (server) unit 500 for processing the Client Key Exchange, Change Cipher Spec, and Finished messages.

((S18) in FIG. 3)

The SSL negotiation (server) unit 500 processes the Client Key Exchange. The EncryptedPreMasterSecret is transmitted to a public key decryption unit 600.

((S19) in FIG. 3)

The public key decryption unit 600 decrypts the EncryptedPreMasterSecret by using the public key N and the private key D which are held by the client 1, and acquires the random number.

((S20) in FIG. 3)

A common key generator 750 generates a common key (including MAC key) used in the common key cryptography from the random number.

((S21) in FIG. 3)

The SSL negotiation (server) unit 500 processes the Change Cipher Spec/Finished messages. The data part (including MAC) of the Finished message is decrypted with the common key and processed.

((S22) in FIG. 3)

The SSL negotiation (server) unit 500 generates Change Cipher Spec, and Finished messages, and transmits the messages to the data transmitter 200. The data part (including MAC) of the Finished message is decrypted with the common key.

((S23) in FIG. 3)

The data transmitter 200 transmits the Change Cipher Spec, and Finished messages to the server 2 through the network control device 100.

((S24) in FIG. 3)

The SSL negotiation (server) unit 500 calls for the communication data generator 800. The communication data generator 800 generates communication data.

((S25) in FIG. 3)

The common key encryption and decryption unit 700 encrypts the communication data by using the common key, and generates encryption data (including MAC). Then, the common key encryption and decryption unit 700 transmits the encryption data (including MAC) to the data transmitter 200.

((S26) in FIG. 3)

The data transmitter 200 transmits the encryption data (including MAC) to the server 2 through the network control device 100.

((S23) in FIG. 4)

The data receiver 310 receives the Change Cipher Spec, and Finished messages transmitted from the client 1 through the network control device 110. The data receiver 310 transmits the Change Cipher Spec, and Finished messages to the SSL negotiation (client) unit 410 for interpreting the Change Cipher Spec, and Finished messages.

((S24) in FIG. 4)

The SSL negotiation (client) unit 410 processes the Change Cipher Spec/Finished messages. The data part (including MAC) of the Finished message is decrypted with the common key, and processed.

((S25) in FIG. 4)

Thereafter, the server 2 waits for data from the client 1. In this example, the common key encryption and decryption unit 710 waits for the data.

((S25) in FIG. 4)

The data receiver 310 receives the encryption data (including MAC) transmitted from the client 1 through the network control device 110. The data receiver 310 transmits the encryption data (including MAC) to the common key encryption and decryption unit 710 for processing the encryption data (including MAC).

((S26) in FIG. 4)

The common key encryption and decryption unit 710 decrypts the encryption data (including MAC) by using the common key, and acquires the communication data.

In the subsequent processing, the common key of the SSL/TLS encrypted communication is correctly encrypted between the client and the server.

In conformity to the specification of the SSL/TLS encrypted communication, all of the message parts of the respective messages are required to be encrypted from the Finished message processing in the dummy SSL/TLS negotiation, but may not be really encrypted without any problem. However, for the purpose of obfuscation, the data parts of the respective messages may be encrypted (scrambled) with the random number and the fixed value transmitted and received in the SSL/TLS negotiation as the common keys.

The obfuscation of this type is of a technique effective when the firewall rigorously checks the data parts of the respective messages.

If the firewall rigorously checks the number of packets of the handshake transmitted and received by the renegotiation of SSL/TLS, the packets of the dummy handshake may be transmitted or received to pretend that the SSL/TLS negotiation is executed several times.

Also, the respective messages (including Change Cipher Spec) after the dummy SSL/TLS negotiation may pretend to be the encrypted data communication. That is, the respective messages are transmitted and received as the data communication, that is, the data part of the application_data. That is, the application_data header and the dummy MAC are allocated to each message (including Change Cipher Spec).

Also, the above-mentioned FIGS. 1 to 4, and 6 will be supplemented.

Although not shown, the server 2 has the same public key decryption unit 600 as that of the client 1. With this configuration, the server 2 can also decrypt the public-key-encrypted common key.

Also, in the embodiment, the SSL negotiation (server) unit 500 and the SSL negotiation (client) unit 400 correspond to a processing unit on the server 2 side which handshakes with another communication apparatus (client 1). Likewise, the SSL negotiation (server) unit 510 and the SSL negotiation (client) unit 410 correspond to a processing unit on the client 1 side.

A first key corresponds to a common key generated in the server 2 (or client 1), and also includes a random number for generating the common key. A second key corresponds to a public key of the client 1 that encrypts the first key. Further, a third key corresponds to a secret key of the client 1 that encrypts the first key. That is, the second key and the third key are paired up with each other.

A processing capability detection (server) unit may be provided in the server 2. With this configuration, the server 2 can determine whether to conduct the reverse SSL on the basis of the processing capability of the server 2 and the processing capability of the client 1 (for example, the respective processing capabilities are compared with each other).

The determination of whether to conduct the reverse SSL may be conducted by the client 1 or the server. The client 1 or the server 2 may determine whether the reverse SSL is conducted, or not, on the basis of the CPU utilization of the server 2, the CPU utilization of the client 1, the maximum processing capability of the server 2, and the maximum processing capability of the client 1.

Figure 5:
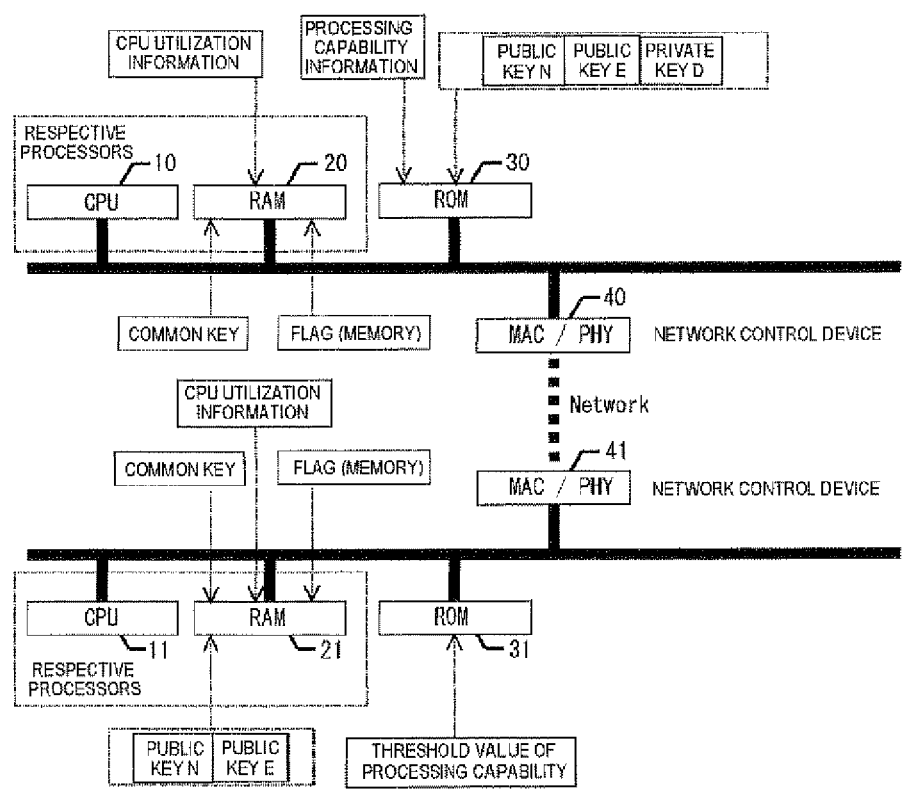
FIG. 5 is a diagram illustrating an example of a hardware configuration according to the embodiment.

FIG. 5 illustrates an example of a hardware configuration diagram of FIG. 2. The client 1 includes a CPU 10 that executes program processing, a RAM 20 that is a temporal storage memory, a ROM 30 that is an unrewritable nonvolatile memory, and a MAC (media access control)/PHY 40 that executes data transmission and reception on the network. On the other hand, the server 2 includes a CPU 11 that executes program processing, a RAM 21 is a temporal storage memory, a ROM 31 that is an unrewritable nonvolatile memory, and a MAC/PHY 41 that executes data transmission and reception on the network. Also, the client 1 and the server 2 are connected to each other through the MAC/PHY 40 and the MAC/PHY 41 on the network.

First, a hardware configuration of the client 1 will be described. The respective processes of the client 1 illustrated in FIG. 3 are executed by the CPU 10 and the RAM 20.

The common key generated by the common key generator 750, the CPU utilization information indicative of the utilization status of the CPU in the client, and the flag (memory) indicative of whether the reverse the SSL/TLS encrypted communication is executed, or not, are saved in the RAM 20.

The processing capability information, the public key N, the public key E, and the private key D are saved in the ROM 30. Among those components, the processing capability information, the public key N, and the public key E may be moved to the RAM 20 and used. The private key D is desirably used in the nonvolatile memory in a tamper tolerant device.

The MAC/PHY 40 is a hardware that controls the network communication, and realizes the network control device 100.

Subsequently, a hardware configuration of the server 2 will be described. The respective processes of the server 2 illustrated in FIG. 4 are executed by the CPU 11 and the RAM 21.

The common key generated by the common key generator 760, the public key N and the public key E acquired from the client 1, the CPU utilization information indicative of the utilization status of the CPU in the server, and the flag (memory) indicative of whether the reverse SSL/TLS negotiation is executed, or not, are saved in the RAM 21.

The information on the threshold value of the processing capability is normally fixed values, and saved in the ROM 30. However, the information may be moved to the RAM 20 and used such that the threshold value is dynamically changed according to a load on the server.

The MAC/PHY 41 is configured by a hardware that controls the network communication, and realizes the network control device 110.

As described above, as the key length of the encryption key (including decryption key) become larger, the number of computer processing is remarkably increased, and the processing time is also remarkably lengthened. In particular, the load on the server that conducts the Public-key Cryptosystem by using the private key is measurably increased. In fact, in order to cope with "Year 2010 Issues on Cryptographic Algorithms", 1024 bits RSA (Rivest Shamir Adleman) Public-key Cryptography which is a currently mainstream Public-key Cryptosystem moves into 2048 bits RSA Public-key Cryptography, which increases the load on the server six to eight times.

For that reason, in the servers that deal with a large number of clients, an improvement treatment in the performance of CPUs leads to a remarkable increase in the costs. Moreover, in the case of the public server, a DOS (Denial Of Service) attack that forces a public key encryption or decryption processing using the private key is assumed, and therefore this influence is enormous.

Even the server that deals with only one client is often problematic. Even the client that deals with only one server confronts with the same problem if a large number of SSL/TLS encrypted communications are used.

In fact, even a simple web access may be problematic. In the web access, there are many cases in which start and disconnection of the SSL/TLS encrypted communication are conducted every time GET is conducted. In a web page where a large number of parts that are subject to GET exist in one page, an enormous number of SSL/TLS encrypted communications are executed. If the CPU performance of the server is not improved, there is a risk that a communication timeout frequently occurs.

The above-mentioned embodiment has been proposed to eliminate the above problems, and a major object of the embodiment is to balance a load of the encryption (decryption) process by the client and the server which execute the SSL/TLS encrypted communication. As a result, the processing speed of the overall system is improved, and the on-board (realizing) costs of the SSL/TLS encrypted communication are more reduced.

Under the circumstances, there is provided a communication apparatus according to the above-mentioned embodiment for communicating with another communication apparatus by using a first key, the communication apparatus including: a processing unit that conducts a handshake process for a key exchange with the another communication apparatus; and a key encryption unit that conducts an encryption process by using a second key, wherein the processing unit conducts a first handshake process with the another communication apparatus without exchanging information on the first key while serving as a reception side of key information, and the processing unit conducts a second handshake process with the another communication apparatus to transmit the information on the first key encrypted by the key encryption unit by using the second key to the another communication apparatus.

According to the communication apparatus, the decryption process can be delegated to another communication apparatus, regardless of existence of the check of the firewall. That is, a load on the communication apparatus can be balanced with another communication apparatus.

Also, in the communication apparatus according to the above-mentioned embodiment, the processing unit conducts the first handshake process with the another communication apparatus by using dummy data.

According to the communication apparatus, since the communication apparatus and another communication apparatus do not exchange information on the first key in the first handshake process, unnecessary processing can be omitted by using the dummy data.

Also, the communication apparatus according to the above-mentioned embodiment further includes a computing unit that conducts arithmetic processing, and a use status monitor that monitors a use status of the computing unit, and notifies the processing unit of the information on the use status. The processing unit determines to conduct the second handshake process on the basis of the use status.

According to the communication apparatus, it can be determined whether the second handshake process is conducted on the basis of the use status of the computing unit. That is, the necessity of the second handshake process can be determined depending on a situation.

Also, the communication apparatus according to the above-mentioned embodiment receives first information indicating that the another communication apparatus can execute the second handshake process from the another communication apparatus, and the processing unit determines to conduct the second handshake process on the basis of the first information and the use status.

According to the communication apparatus, the necessity of the second handshake process can be determined depending on the situation.

Also, the communication apparatus according to the above-mentioned embodiment receives second information indicating a processing capability of the another communication apparatus from the another communication apparatus, and the first processing unit determines to conduct the second handshake process on the basis of the first information, the second information, and the use status.

According to the communication apparatus, the necessity of the second handshake process can be determined according to the processing capability of another communication apparatus.

There is provided a communication apparatus according to the above-mentioned embodiment for communicating with another communication apparatus by using a first key, the communication apparatus including: a processing unit that conducts a handshake process for a key exchange with the another communication apparatus; and a key decryption unit that conducts a decryption process by using a third key, wherein the processing unit conducts a first handshake process with the another communication apparatus without exchanging information on the first key while serving as a transmission side of key information, and the processing unit conducts a second handshake process with the another communication apparatus to receive the information on the first key which is encrypted by using a second key which is paired up with the third key from the another communication apparatus.

According to the communication apparatus, the decryption process which is conducted in another communication apparatus in a normal situation can be delegated to the communication apparatus, regardless of existence of the check of the firewall. That is, a load on the another communication apparatus can be balanced with the communication apparatus.

Also, in the communication apparatus according to the above-mentioned embodiment, the processing unit conducts the first handshake process with the another communication apparatus by using dummy data.

According to the communication apparatus, since the communication apparatus and another communication apparatus do not exchange information on the first key in the first handshake process, unnecessary processing can be omitted by using the dummy data.

Also, when the first handshake process is completed, the communication apparatus according to the above-mentioned embodiment transmits a signal requesting the another communication apparatus to start the second handshake process to the another communication apparatus.

According to the communication apparatus, the another communication apparatus can start to conduct the second handshake process in response to a signal from the communication apparatus.

Also, in the first handshake process, the communication apparatus according to the above-mentioned embodiment transmits to the another communication apparatus information indicating that the communication apparatus can execute the second handshake process.

According to the communication apparatus, at a stage of conducting the first handshake process, the another communication apparatus and the communication apparatus can recognize each other to conduct the second handshake process. With this configuration, the another communication apparatus and the communication apparatus can omit an unnecessary process in the first handshake process.

There is provided a communication system according to the above-mentioned embodiment for conducting a communication between a first communication apparatus and a second communication apparatus by using a first key, wherein the first communication apparatus includes: a first processing unit that conducts a handshake process for a key exchange with the second communication apparatus; and a key encryption unit that conducts an encryption process by using a second key, the second communication apparatus includes: a second processing unit that conducts the handshake process for the key exchange with the first communication apparatus; and a key decryption unit that conducts a decryption process by using a third key which is paired up with the second key, the first and second processing units conduct a first handshake process with each other without exchanging information on the first key while the first processing unit serves as a reception side of key information and the second processing unit serves as a transmission side of the key information, and the first and second processing units conduct a second handshake process with each other in which the first processing unit allows the key encryption unit to encrypt information on the first key by using the second key and transmits the information on the first key encrypted by the key encryption unit by using the second key to the second communication apparatus, and the second processing unit receives the information on the first key which is encrypted by using the second key from the first communication apparatus and allows the key decryption unit to decrypt the received information on the first key.

According to the communication system, the decryption process which is normally conducted by the first communication apparatus can be delegated to the second communication apparatus, regardless of existence of the check of the firewall. That is, a load on the first communication apparatus can be balanced with the second communication apparatus.

Also, in the communication system according to the above-mentioned embodiment, the first communication apparatus and the second communication apparatus conduct the first handshake process by using the dummy data.

According to the communication system, since the first communication apparatus and the second communication apparatus do not exchange the information on the first key in the first handshake process, unnecessary processing can be omitted by using the dummy data.

Also, in the communication system according to the above-mentioned embodiment, when the first handshake process is completed, the second communication apparatus transmits a signal requesting the first communication apparatus to start the second handshake process to the first communication apparatus.

According to the communication system, the first communication apparatus can conduct the second handshake in response to a signal from the second communication apparatus.

Also, in the communication system according to the above-mentioned embodiment, in the first handshake process, the second communication apparatus transmits first information indicating that the second handshake process can be executed to the first communication apparatus, and the first communication apparatus that receives the first information notifies the second communication apparatus that the second handshake process is conducted.

According to the communication system, at a stage of conducting the first handshake process, the first communication apparatus and the second communication apparatus can recognize each other to conduct the second handshake process. With this configuration, the first communication apparatus and the second communication apparatus can omit an unnecessary process in the first handshake process.

Also, in the communication system according to the above-mentioned embodiment, the second communication apparatus transmits one or more usable cryptosystems to the first communication apparatus together with the first information, and when the first communication apparatus determines that the second handshake process is not conducted, the first communication apparatus selects a cryptosystem used in the first handshake process from the one or more usable cryptosystems, and notifies the second communication apparatus of the selected cryptosystem.

According to the communication system, the first communication apparatus notifies the second communication apparatus of the cryptosystem used in the first handshake process so as to notify the second handshake process that the second handshake is not conducted.

Also, in the communication apparatus according to the above-mentioned embodiment, the first communication apparatus further includes a first computing unit that conducts arithmetic processing, and a use status monitor that monitors a use status of the first computing unit, and determines to conduct the second handshake process on the basis of information on the use status and the first information.

According to the communication system, the necessity of the second handshake process can be determined according to the use status of the first computing unit.

Also, in the communication apparatus according to the above-mentioned embodiment, the second communication apparatus further includes a second computing unit that conducts arithmetic processing, and transmits second information indicating a processing capability of the second computing unit to the first communication apparatus. The first communication apparatus determines to conduct the second handshake process on the basis of the first information, the second information, and the use status.

According to the communication system, the necessity of the second handshake process can be determined according to the processing capability of the second communication apparatus.

There is provided a communication method according to the above-mentioned embodiment for key exchange in a communication apparatus for exchanging a first key with another communication apparatus, the communication method including: conducting a first handshake process without exchanging information on the first key with the another communication apparatus while serving as a reception side of key information; and conducting a second handshake process with exchanging the information on the first key with the another communication apparatus while serving as a transmission side of the key information.

Also, the communication method according to the above-mentioned embodiment includes transmitting the information on the first key which is encrypted with a second key to the another communication apparatus in the second handshake process.

According to the communication method, the decryption process which is normally conducted by the communication apparatus can be delegated to another communication apparatus, regardless of existence of the check of the firewall. That is, a load on the communication apparatus can be balanced with another communication apparatus.

In an encrypted communication method according to the above-mentioned embodiment, after an SSL/TLS negotiation (SSL/TLS handshake) is executed with a client as "client in an SSL/TLS encrypted communication" and a server as "server in the SSL/TLS encrypted communication", the SSL/TLS negotiation (SSL/TLS handshake) is executed without disconnecting the communication with the client as "server in the SSL/TLS encrypted communication" and the server as "client in the SSL/TLS encrypted communication". In the SSL/TLS negotiation (SSL/TLS handshake) with the client as "client in the SSL/TLS encrypted communication" and the server as "server in the SSL/TLS encrypted communication", the decryption of the Public-key Cryptosystem by using the private key is not executed. In the SSL/TLS negotiation (SSL/TLS handshake) with the client as "server in the SSL/TLS encrypted communication" and the server as "client in the SSL/TLS encrypted communication", the decryption of the Public-key Cryptosystem by using the private key is executed, and a common key of the common key encryption is generated between the client and the server while holding a secret over a third party.

According to this configuration, the server enables the client to implement the decryption process of the Public-key Cryptosystem by using the private key, which is high in processing load, as a result of which the processing speed of the overall system can be improved, and the server costs can be reduced.

In recent years, there are a large number of client devices supporting both of the server function and the client function in the SSL/TLS encrypted communication, and therefore the above-mentioned embodiment can be employed by the large number of systems.

Also, since the SSL/TLS negotiation (SSL/TLS handshake) is executed in advance with the client as "client in the SSL/TLS encrypted communication" and the server as "server in the SSL/TLS encrypted communication", the communication is hardly jammed by a NAT or the firewall.

Also, in the encrypted communication method according to the above-mentioned embodiment, in the SSL/TLS negotiation (SSL/TLS handshake) with the client as "client in the SSL/TLS encrypted communication", the client notifies the server that the client is operable as "server in the SSL/TLS encrypted communication", or the client requests the server to operate the client as "server in the SSL/TLS encrypted communication".

According to this configuration, the server can know whether the client dynamically holds the server function in the SSL/TLS encrypted communication or not. That is, when the server communicates with a large number of clients including the clients holding no server function, the clients holding the server function can be easily discriminated.

Also, in the encrypted communication method according to the above-mentioned embodiment, the client notifies the server that the client is operable as "server in the SSL/TLS encrypted communication" by the presentation of the cipher suite, or the client requests the server to operate the client as "server in the SSL/TLS encrypted communication".

According to this configuration, the server can surely know whether the client dynamically holds the server function in the SSL/TLS encrypted communication, or not.

A specific value may be set for the Random bytes of Client Hello or the session ID, and used as a sign that the client holds the server function. However, there arises a problem if the client holding no server function accidentally sets that value.

Also, in the encrypted communication method according to the above-mentioned embodiment, the client includes a client status monitor that monitors a processing status of the client, and notifies the server that the SSL/TLS negotiation (SSL/TLS handshake) with the client as "server in the SSL/TLS encrypted communication" is executable, according to the processing status obtained by the client status monitor. Alternatively, the client determines whether to request the server to operate the client as "server in the SSL/TLS encrypted communication".

According to this configuration, the client can be dealt with as "server in the SSL/TLS encrypted communication" only when the client can easily execute the decryption process of the public key by using the private key. Therefore, the client can be prevented from being broken down by the decryption process.

Also, in the encrypted communication method according to the above-mentioned embodiment, in the SSL/TLS negotiation (SSL/TLS handshake) with the server as "server in the SSL/TLS encrypted communication", the server requests the client to operate the client as "server in the SSL/TLS encrypted communication".

According to this configuration, the server enables the client to dynamically implement the decryption process of the Public-key Cryptosystem high in the processing load by using the private key. For example, when it can be discriminated that the processing capability of the connected client is excellent, the server can authorize the client to decrypt the Public-key Cryptosystem by using the private key.

Also, in the encrypted communication method according to the above-mentioned embodiment, the server requests the client to operate as "server in the SSL/TLS encrypted communication" by the presentation of the cipher suite.

According to this configuration, the client can surely know whether to request the client to dynamically operate as "server in the SSL/TLS encrypted communication".

A specific value may be set for the Random bytes of Server Hello or the session ID, and used as a request for operating the client as "server in the SSL/TLS encrypted communication". However, there arises a problem if the client is connected to a normal server, and the server accidentally sets that value.

Also, in the encrypted communication method according to the above-mentioned embodiment, the server includes a server status monitor that monitors a processing status of the server, and requests the client to execute the SSL/TLS negotiation (SSL/TLS handshake) with the server as "client in the SSL/TLS encrypted communication", according to the processing status obtained by the server status monitor.

According to this configuration, the client can be dealt with as "server in the SSL/TLS encrypted communication" only when the server can easily execute the decryption process of the public key by using the private key. Therefore, the server can be prevented from being broken down by the decryption process, and the load on the client can be reduced.

Also, in the encrypted communication method according to the above-mentioned embodiment, the server includes a processing capability detector that detects a processing capability of the client, grasps the processing capability of the client by the processing capability detector, and determines whether to requests the client having a given processing capability to execute the SSL/TLS negotiation (SSL/TLS handshake) with the server as "client in the SSL/TLS encrypted communication".

According to this configuration, no load is normally applied to the client low in the processing capability, and the client low in the processing capability can be urgently requested to conduct the decryption process only when the processing capability of the server is reduced down to a dangerous level.

Also, in the encrypted communication method according to the above-mentioned embodiment, in the SSL/TLS negotiation (SSL/TLS handshake) with the client as "server in the SSL/TLS encrypted communication" and the server as "client in the SSL/TLS encrypted communication", the MAC of the dummy data is allocated to the data parts of the respective handshake and change_cipher_spec except for the Finished.

According to this configuration, the SSL/TLS negotiation (SSL/TLS handshake) with the client as "server in the SSL/TLS encrypted communication" and the server as "client in the SSL/TLS encrypted communication" can pose as the common key encryption in the SSL/TLS encrypted communication with the client as "client in the SSL/TLS encrypted communication" and the server as "server in the SSL/TLS encrypted communication". With this configuration, the communication is little jammed by the firewall.

Also, in the encrypted communication method according to the above-mentioned embodiment, the client and server create the common key according to a fixed value, a predetermined method, data exchanged in the SSL/TLS negotiation (SSL/TLS handshake) with the client as "client in the SSL/TLS encrypted communication" and the server as "server in the SSL/TLS encrypted communication", or data created on the basis of the exchanged data, and the data parts of the respective handshake and change_cipher_spec except for the Finished are encrypted by using the created common key.

According to this configuration, the communication is less jammed by the firewall.

Also, in the encrypted communication method according to the above-mentioned embodiment, in the SSL/TLS negotiation (SSL/TLS handshake) with the client as "server in the SSL/TLS encrypted communication" and the server as "client in the SSL/TLS encrypted communication", the MAC of the dummy data and application_data header are allocated to the data parts of the respective handshake and change_cipher_spec.

According to this configuration, the SSL/TLS negotiation (SSL/TLS handshake) with the client as "server in the SSL/TLS encrypted communication" and the server as "client in the SSL/TLS encrypted communication" can pose as the data communication in the SSL/TLS encrypted communication with the client as "client in the SSL/TLS encrypted communication" and the server as "server in the SSL/TLS encrypted communication". With this configuration, the communication is little jammed by the firewall.

Also, in the encrypted communication method according to the above-mentioned embodiment, the client and server create the common key according to a fixed value, a predetermined method, data exchanged in the SSL/TLS negotiation (SSL/TLS handshake) with the client as "client in the SSL/TLS encrypted communication" and the server as "server in the SSL/TLS encrypted communication", or data created on the basis of the exchanged data, and the data parts of the respective handshake and change_cipher_spec are encrypted by using the created common key.

According to this configuration, the communication is less jammed by the firewall.

The SSL/TLS encrypted communication according to the above-mentioned embodiment is excellent in affinity with a communication device such as the firewall, and moreover the client can take care of the Public-key encryption and decryption process by using the private key on behalf of the server in accordance with the CPU utilization (load) of the server. Therefore, the above-mentioned embodiment is useful, for example, the server costs can be reduced.

This application is based upon and claims the benefit of priority of Japanese Patent Application No. 2011-77626 filed on Mar. 31, 2011, the contents of which are incorporated herein by reference in its entirety.

What is claimed is:

1. A communication apparatus for communicating with another communication apparatus by using a first key, the communication apparatus comprising:
   a handshake processor configured to conduct a handshake process for a key exchange with the another communication apparatus; and
   a key encryptor configured to conduct an encryption process by using a second key, wherein:
   the handshake processor is configured to conduct a first handshake process with the another communication apparatus without exchanging information on the first key,
   the handshake processor is configured to conduct a second handshake process with the another communication apparatus to transmit the information on the first key encrypted by the key encryptor by using the second key to the another communication apparatus, and
   the another communication apparatus includes a key decryptor configured to conduct a decryption process by using a third key which is paired up with the second key.

2. The communication apparatus according to claim 1, wherein
   the handshake processor is configured to conduct the first handshake process with the another communication apparatus by using dummy data.

3. The communication apparatus according to claim 1, further comprising:
   an arithmetic processor configured to conduct arithmetic processing; and
   a use status monitor configured to monitor a use status of the arithmetic processor and notify the handshake processor of information on the use status, wherein:
   the handshake processor determines to conduct the second handshake process on the basis of the use status.

4. The communication apparatus according to claim 3, wherein
   the communication apparatus receives from the another communication apparatus first information indicating that the another communication apparatus can execute the second handshake process, and
   the handshake processor is configured to determine to conduct the second handshake process on the basis of the first information and the use status.

5. The communication apparatus according to claim 4, wherein
   the communication apparatus receives from the another communication apparatus second information indicating a processing capability of the another communication apparatus, and
   the handshake processor is configured to determine to conduct the second handshake process on the basis of the first information, the second information, and the use status.

6. A communication apparatus for communicating with another communication apparatus by using a first key, the communication apparatus comprising:
   a handshake processor configured to conduct a handshake process for a key exchange with the another communication apparatus; and
   a key decryptor configured to conduct a decryption process by using a third key, wherein:
   the handshake processor is configured to conduct a first handshake process with the another communication apparatus without exchanging information on the first key, and
   the handshake processor is configured to conduct a second handshake process with the another communication apparatus to receive the information on the first key which is encrypted by using a second key which is paired up with the third key from the another communication apparatus.

7. The communication apparatus according to claim 6, wherein
   the handshake processor is configured to conduct the first handshake process with the another communication apparatus by using dummy data.

8. The communication apparatus according to claim 6, wherein
   when the first handshake process is completed, the communication apparatus transmits a signal requesting the another communication apparatus to start the second handshake process to the another communication apparatus.

9. The communication apparatus according to claim 6, wherein
   in the first handshake process, the communication apparatus transmits to the another communication apparatus information indicating that the communication apparatus can execute the second handshake process.

10. A communication system for conducting a communication between a first communication apparatus and a second communication apparatus by using a first key, wherein
    the first communication apparatus includes:
    a first first handshake processor configured to conduct a handshake process for a key exchange with the second communication apparatus; and
    a key encryptor configured to conduct an encryption process by using a second key,
    the second communication apparatus includes:
    a second first handshake processor configured to conduct the handshake process for the key exchange with the first communication apparatus; and
    a key decryptor configured to conduct a decryption process by using a third key which is paired up with the second key,
    the first and second handshake processors are configured to conduct a first handshake process with each other without exchanging information on the first key, and
    the first and second handshake processors are configured to conduct a second handshake process with each other in which the first processing unit allows the key encryptor to encrypt information on the first key by using the second key and transmits the information on the first key encrypted by the key encryptor by using the second key to the second communication apparatus, and the second handshake processor receives the information on the first key which is encrypted by using the second key from the first communication apparatus and allows the key decryptor to decrypt the received information on the first key.

11. The communication system according to claim 10, wherein
the first communication apparatus and the second communication apparatus conduct the first handshake process by using dummy data.

12. The communication system according to claim 10, wherein
when the first handshake process is completed, the second communication apparatus transmits a signal requesting the first communication apparatus to start the second handshake process to the first communication apparatus.

13. The communication system according to claim 10, wherein
in the first handshake process, the second communication apparatus transmits to the first communication apparatus first information indicating that the second communication apparatus can execute the second handshake process, and
the first communication apparatus that receives the first information notifies the second communication apparatus that the second handshake process is conducted.

14. The communication system according to claim 13, wherein
the second communication apparatus transmits one or more usable cryptosystems together with the first information to the first communication apparatus, and
when the first communication apparatus determines that the second handshake process is not conducted, the first communication apparatus selects a cryptosystem used in the first handshake process from the one or more usable cryptosystems, and notifies the second communication apparatus of the selected cryptosystem.

15. The communication system according to claim 13, wherein
the first communication apparatus further includes:
a first arithmetic processor configured to conduct arithmetic processing; and
a use status monitor configured to monitors a use status of the first arithmetic processor, and
the first communication apparatus determines to conduct the second handshake process on the basis of information on the use status and the first information.

16. The communication system according to claim 15, wherein
the second communication apparatus further includes a second arithmetic processor configured to conduct arithmetic processing, and transmits second information indicating a processing capability of the second arithmetic processor to the first communication apparatus, and
the first communication apparatus determines to conduct the second handshake process on the basis of the first information, the second information, and the use status.

17. The communication apparatus according to claim 1, wherein the handshake processor is configured to conduct the first handshake process with the another communication apparatus in an SSL/TLS negotiation.

18. The communication apparatus according to claim 17, wherein the handshake processor is configured to receive a Client Key Exchange from the another communication apparatus in the first handshake process.

19. The communication apparatus according to claim 18, wherein the Client Key Exchange includes a dummy data.

* * * * *